Figure 1:
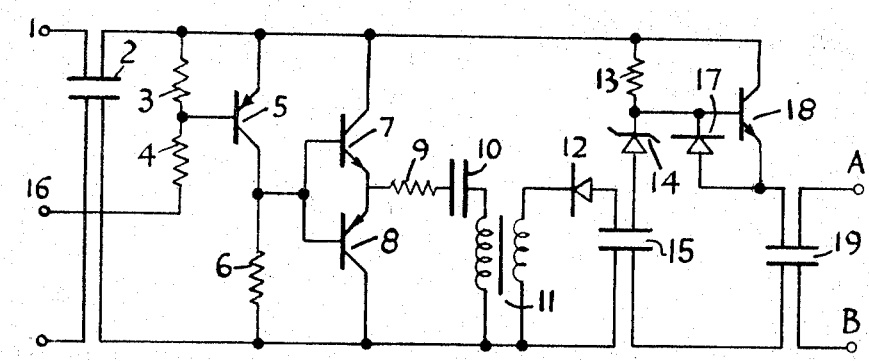
Figure 1:
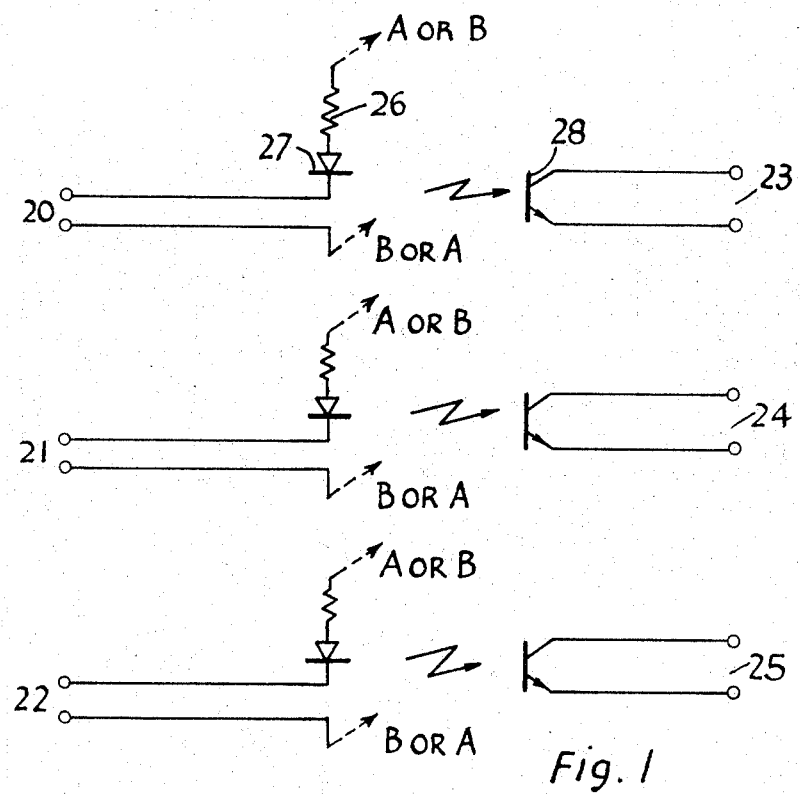

United States Patent [19]
Brown et al.

[11] 3,809,930
[45] May 7, 1974

[54] STATIC RELAYING CIRCUIT

[75] Inventors: Christopher Robert Brown; Terence Malcolm George; David John Norton, all of London, England

[73] Assignee: Westinghouse Brake and Signal Company Limited, London, England

[22] Filed: Sept. 23, 1971

[21] Appl. No.: 183,162

[30] Foreign Application Priority Data
Oct. 29, 1970  Great Britain.................... 51334/70

[52] U.S. Cl.................... 307/311, 307/253, 307/210
[51] Int. Cl. .......................................... H03k 17/00
[58] Field of Search........ 307/311, 253, 210; 328/2; 250/217 SS, 214 R

[56] References Cited
UNITED STATES PATENTS

| | | | |
|---|---|---|---|
| 3,499,158 | 3/1970 | Lavine et al.................. | 250/117 SS |
| 3,408,507 | 10/1968 | Martin.......................... | 250/217 X |
| 3,321,631 | 5/1967 | Biard et al. ..................... | 307/311 X |
| 3,413,480 | 11/1968 | Biard et al..................... | 250/217 SS |
| 3,579,703 | 5/1971 | Schmerund..................... | 250/217 S |

Primary Examiner—Rudolph V. Rolinec
Assistant Examiner—B. P. Davis
Attorney, Agent, or Firm—H. A. Williamson; J. B. Sotak

[57] ABSTRACT

A system of fail-safe static logic is proposed which uses circuit elements closely analogous to conventional electromechanical relays. The d.c. feeds found in conventional relay circuitry are replaced by pulsating feeds originating from a multivibrator. The coil of a conventional relay becomes a simple electronic circuit, which normally gives a positive d.c. output (corresponding to the release condition of the relay), changing in polarity to a negative d.c. output (equivalent to pick-up of the relay) when a pulsating feed is applied to the input. Each conventional relay contact is replaced by an insulated signal coupler which is capable of passing on a pulsating feed signal provided it is also enabled by a d.c. voltage of correct polarity obtained from the output terminals of the 'coil' circuit, the sense of the connexions determining whether the contact acts as a 'front' or a 'back.'

18 Claims, 7 Drawing Figures

STATIC RELAYING CIRCUIT

This invention relates to static relaying circuits and relates especially but not exclusively to such circuits which can be utilized analogously to electromechanical relays and can afford similar features of safety in operation.

According to the present invention there is provided a static relaying circuit having supply terminals for the connection of a modulating device and input and output terminals between which an insulated signal coupler is provided, in one of two states of which signal coupler an applied modulation function is transmittable between the input and output terminals and in the other of the two states such a signal is blocked, circuit means energisable from the supply terminals and responsive to the presence or absence of a modulation at the control terminals to produce an intermediate signal to determine the state of the insulated signal coupler.

An insulated signal coupler essentially comprises a component or assembly of components by means of which a signal is transmittable between input and output terminals in complete absence of electrical interconnection between the input and output terminals.

Thus in a preferred manner of putting the invention into practice, the insulated signal coupler may comprise an illumination emitting diode and an illumination responsive semiconductor switch device so connected that the latter is only subject to illumination to which it is responsive when said significant polarity of signal is applied to the diode.

It is to be understood that illumination is intended in the foregoing and the claims to mean radiation of visible or other wavelengths although the signal couplers employed specifically in the described embodiments relay principally upon the presence or absence of visible illumination.

If the static relaying circuit is required to be self-holding, the signal coupler can constitute a static switch for applying modulation to the control terminals of the relaying circuit as a holding control input. An analogy may therefore be observed with electromechanical relays.

By selecting the sense of connection of the insulated signal coupler to receive the intermediate signal the coupler can operate to stimulate "front" or "back" relay contacts and accordingly by employing a plurality of such insulated signal couplers, all connected to be controlled by the intermediate signal, a plurality of input and output terminals may be accommodated thereby simulating a plurality of "front" and/or "back" contacts of an electromechanical relay.

The invention therefore provides relay interlocking systems with the functions of electromechanical relays thereof replaced by static relaying circuits in accordance with the invention and they can thereby be endowed with the far-reaching advantages of static switching techniques as compared with relays which employ moving parts and electrical contacts.

Figure 2:
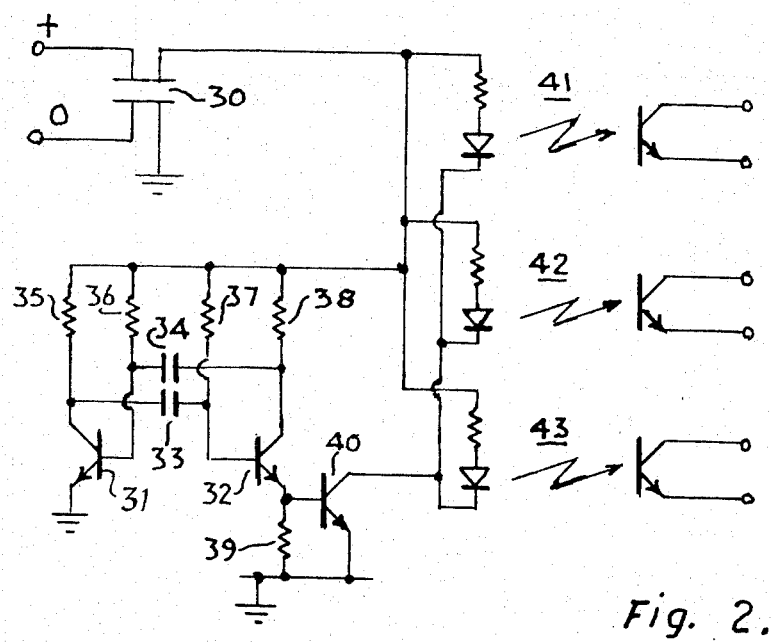
Figure 3A:
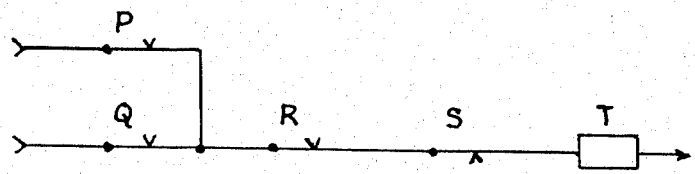
Figure 3B:
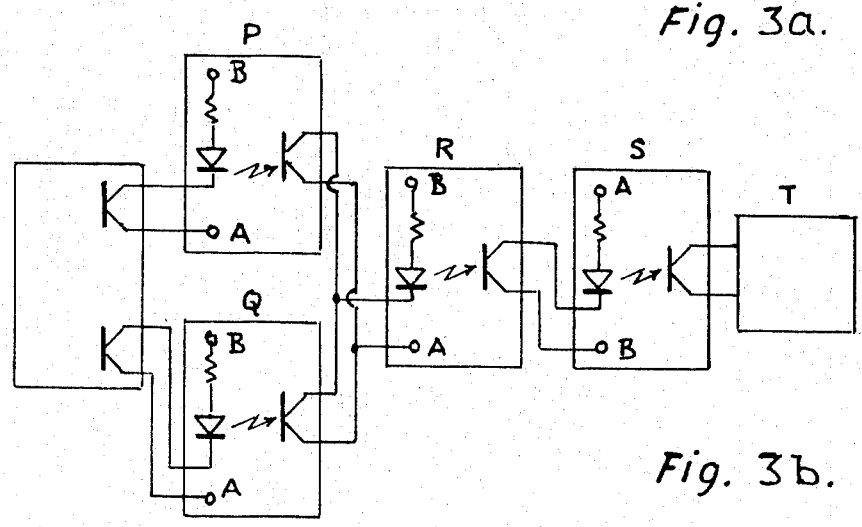
Figure 4:
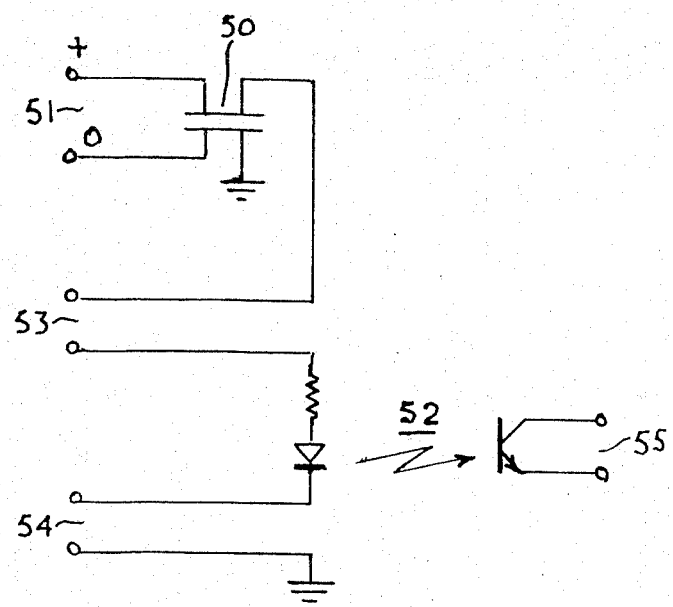
Figure 5:
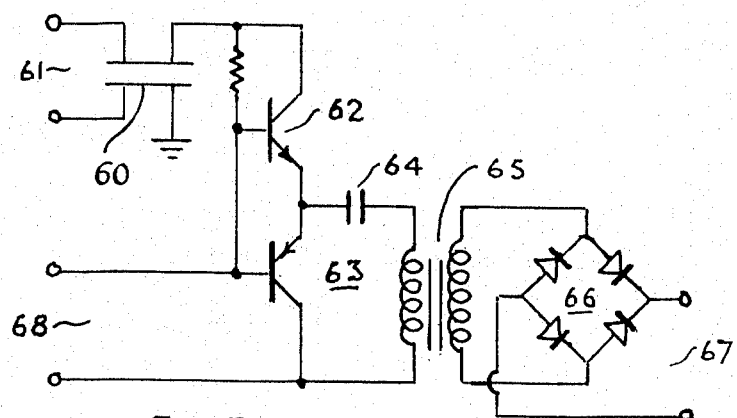
Figure 6:
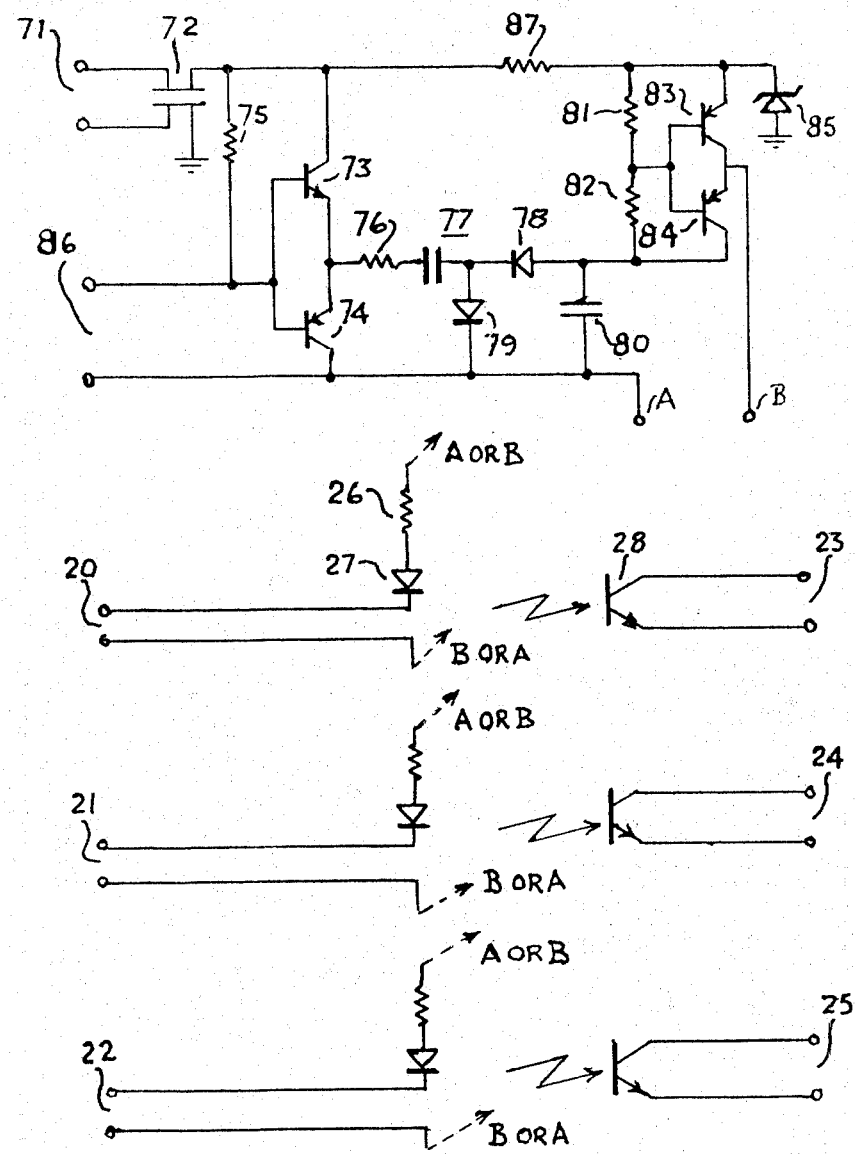

In order that the invention may be more clearly understood and readily carried into effect, the same will be further described by way of example only with reference to the accompanying drawings in which, FIG. 1 illustrates a preferred static relaying circuit in accordance with the invention, FIG. 2 illustrates a pulsating signal feed circuit for use in connection with the relaying circuit of FIG. 1, FIGS. 3a and 3b illustrates diagrammatically a simple relay circuit and its equivalent using static relaying circuits, FIG. 4 illustrates an input buffer circuit, FIG. 5 illustrates an output buffer circuit, and FIG. 6 illustrates an alternative to the preferred static relaying circuit in accordance with the invention.

Referring to FIG. 1, the circuit essentially comprises two parts which may be considered as analogous on the one hand to the "coil" of an electromechanical relay and on the other hand to the "contacts" of such a relay. The "coil" portion has a positive supply input terminal denoted by reference 1 connected to one of the plates of a 4-terminal capacitor 2 the other plate of which is connected to a common ground potential. This capacitor provides isolation of the supply for high frequency signals to prevent interaction between circuits connected to the same supply.

The other two terminals of the four terminal capacitor 2 are connected to supply a transistor input circuit comprising three transistors 5, 7 and 8. A control terminal 16 for connection to a suitable modulation device is connected to a potential divider formed of two resistors 3 and 4 the other end of which is connected to the positive line and the junction of which is connected to the base electrode of transistor 5 which is provided with a collector circuit resistor 6. The collector electrode of 5 is connected to the commoned bases of transistors 7 and 8 which are of opposite type and the commoned emitters of these two transistors are connected via a resistor 9 to a timed capacitor 10 and transformer 11. The secondary winding of this transformer is connected via a diode 12 to a further four-terminal capacitor 15 the alternative terminals of which connect it in series with a resistor 13 and a zener diode 14. The junction of 13 and 14 is connected to the base of yet another transistor 18 which is itself in series with a further four terminal capacitor 19 the alternative terminals of which are intermediate signal output terminals A and B. The transistor 18 is further provided with a diode 17 with polarity shown between the base and the emitter.

The "contact" portion of the relaying circuit comprises three insulated signal couplers to which the potential at terminals A and B is applied in a desired sense to effect coupling between input and output terminals in dependence upon the polarity at terminals A and B. Hence, connections to the insulated signal couplers are shown dotted with alternative connections. Three such signal couplers are shown and the relaying circuit is thereby provided with three sets of input terminals 20, 21 and 22, with respective corresponding output terminals 23, 24 and 25. The first insulated signal coupler comprises a resistor 26 and an illumination emitting diode 27 with a path for illumination to an illumination responsive semiconductor device 28. The insulating signal coupler is so constructed that the illumination responsive device is only subject to illumination to which it is responsive when a significant polarity of signal is applied to the diode to render the diode conducting in the forward direction. For extreme safety, it is preferably desirable to so design the diode 27 that it will not break down in reverse at any voltage which is less than the supply voltage to the circuit. The insulated signal couplers between terminals 21 and 24 and 22 and 25 respectively are identical to that formed by devices 27 and 28 except that the selective connection to terminals A and B if required to effectively provide front and back "contacts" of the relaying circuit.

In operation of the circuit of FIG. 1, a d.c. positive supply is connected to the terminal 1, and a static switching modulating drive is connected to the terminal 16 the lower third terminal being common to the supply and the modulation input. Assuming that the static switch modulating device is permanently open the transistor 5 operating in a switching mode is in the "off" state and transistors 7 and 8 are respectively "off" and "on." Under these conditions, no signal is transmitted via transformer 11 and the base-emitter circuit of transistor 18 enables a voltage of typically +5 volts to appear across terminals A and B as set by the zener diode 14. A pulsating modulation or noise signal at terminal 16 similarly leads to no signal via the transformer 11 because of the rejection capability of the tuned circuit provided by the transformer inductance and the capacitance 10 connected in series.

In the presence of a switching mode across terminal 16 and the common ground terminal of the circuit, the frequency of which is at the response frequency of the tuned circuit, a half wave of oscillation is applied via the transformer to the capacitor 15 due to transistors 5, 7 and 8 being intermittently switched to the condition opposite to that at which they rested previously. Accordingly, the circuit operates to generate at the base electrode of transistor 18 typically a negative voltage of about 5 volts which is transmitted via the diode 17 to the output capacitor 19 and intermediate output terminal A. The transistor 18 is biassed off at this time due to the negative base voltage.

With terminals A and B connected to the insulated signal coupler between terminals 20 and 23 so that in the presence of intermittent switching of the timed frequency at terminals 16 the diode 27 conducts, it will be appreciated that an intermittent signal input at terminals 20 will be communicated to the terminals 23 as an intermittent switching function of the transistor 28. This operation can be considered as analogous to "front" contact operation of an electromechanical relay, the modulation at 16 being analogous to an "energisation" of a relay coil. If however the terminals A and B are connected to the insulated signal coupler embodying devices 27 and 28 in the opposite sense, in the absence of intermittent switching across terminals 16, the potential at terminal B is positive in relation to that at terminal A and this condition will give rise to conduction of the diode 27. Thus in these conditions, an intermittent switching function across terminals 20 is transmitted to the terminals 23 as an intermittent switching function of the transistor 28. This therefore corresponds to relay "back" contacts. Similar operation applies to the insulated signal couplers between input terminals 21 and output terminals 24 and input terminals 22 and output terminals 23. Again, as many input signal couplers may be included as may be required for purposes of the function of the static relaying circuit.

From the above description it will be appreciated that in order to operate the relaying circuit described, a suitable feed circuit is necessary which is operable to effect static switching at a desired frequency at the control input to the circuit and additionally at the input terminals 20, 21 and 22. A typical such feed circuit is illustrated in FIG. 2 in which a d.c. supply of the polarity shown is connected via a 4-terminal capacitor 30 to a multi-vibrator formed of transistors 31 and 32, capacitors 33 and 34 and resistors 35, 36, 37 and 38.

A typical operating frequency for the multi-vibrator is 10KHz. In the emitter connection to the transistor 32 there is included a resistor 39 across which a base drive to the switching transistor 40 is derived, the transistor 40 being operable to connect the cathodes of the diodes of further insulated signal couplers 41, 42 and 43 to earth intermittently. The feed circuit outputs constitute the collector emitter circuits of the illumination responsive semiconductor devices of these couplers. In the arrangement shown, the couplers are three in number but further couplers may be provided all operated from the transistor 40 is desired. The feed circuit therefore operates to produce isolated switching by the mutually isolated semiconductor devices of the signal couplers. Furthermore, the switching by these transistors is identically in phase and as will be appreciated hereafter such phase coherence is necessary for all "contacts" of relaying circuits included in an interlocking scheme for operating a particular further relaying circuit.

Referring now to FIG. 3, at FIG. 3a there is illustrated a typical simple relay interlocking circuit whereby the relay T is energised only in predetermined conditions of four further relays P, Q, R and S front and back contacts of which are involved in the feed to circuit T. The diagrammatical illustration at FIG. 3a is conventional and requires no further discussion. FIG. 3b illustrates the analogous interlocking scheme employing "contacts" of static relaying circuit such as the one described above with reference to FIG. 1.

It will be understood that for each of the relays with contacts P, Q, R, S and T there is a static relaying circuit such as described above with reference to FIG. 1. For the relevant contacts of relays P, Q, R and S there are allocated insulated signal couplers which are appropriately connected to intermediate terminals A and B such as those in FIG. 1 to make these couplers analogous to the front or back contacts of the relays. The output terminals of the "back contact" of the relaying circuit S are connected to control input terminals, (that is terminals corresponding to terminals 16 of FIG. 1) of the "coil" portion of the static relaying circuit T. The inputs to the "front" contacts of the relaying circuits P and Q are connected to the output sides of the isolated insulated signal couplers of a single feed unit such as shown in FIG. 2. Accordingly, co-phasal operation of the contact portion of each of the relays in the interlocking scheme illustrated is guaranteed. A similar co-phasal modulation requirements also exists in interlocking arrangements in which pairs of output terminals of different relaying circuits are arranged in series. Thus a general co-phasal modulation function is needed for "contact" portions. It will be understood however that the "coil" portions of the plurality of static relaying circuits such as P, Q, R and S of the complete circuit may be controlled at their control inputs by the presence or absence of pulsating signals which are not cophasal and which bear no phase relationship with the pulsating of the feed unit which supplies the coil portion of relay T over the relevant contacts of P, Q, R, and S stipulated in FIG. 3b.

It may be that no operation of the static relaying circuit T, the circuit is required to hold over its own "contacts." In this event, a "front contact" portion of the relaying circuit T may have its output terminals connected in series with a further feed circuit output such as that associated with the isolator 43 of the feed circuit of FIG. 2 and the control terminals of the "coil" portion of the relay T. The multi-vibrator switching frequency is therefore continuously applied following operation of circuit T, back to the "coil" portion and "holds" the static relaying circuit T "energised."

Reference may now be made to FIG. 4 which illustrates a simple form of input buffer circuit the purpose of which is to enable a pulsating "input" to be applied to a static relaying circuit in accordance with the invention in response to "closure" of voltage free "contacts." Typically, the contacts may be those of a manually operable push-button for example. The circuit consists essentially of a 4-terminal isolating capacitor 50 connected to supply terminals 51, and an insulated signal coupler 52 which consists essentially of an illumination-producing diode and an illumination responsive semiconductor device. The manually operable contacts are assumed connected to further input terminals 53 and an output from a pulsating feed circuit is connected to terminals 54. On closure of the contacts across 53 and in the presence of a pulsating switching function across terminals 54, the coupler 52 is operated to provide pulsating switching function across the emitter collector path of the semiconductor device at terminals 55. Terminals 55 can therefore be connected in an interlocking circuit such as described in the foregoing, the pulsating switching function across 55 only being present in the event of the contacts across terminals 53 being closed.

Referring to FIG. 5, this illustrates a suitable form of output buffer circuit which can accept a pulsating switching input signal to produce a d.c. output voltage of fixed polarity which is suitable for feeding an external device such as a relay, a lamp or an alarm. Again the circuit includes a 4-terminal capacitor 60 connected to d.c. supply terminals 61 and the upper plate of the capacitor is connected to a pair of emitter follower transistors 62 and 63 having base connections and a common emitter connection via a coupling capacitor 64 to the primary winding of a transformer 65. The secondary winding of 65 is coupled via a rectifier bridge 66 to output terminals 67 from which a d.c. potential may be obtained when the terminals 68 have a pulsating switching function across them to intermittently switch the transistors 62 and 63 on and off in sympathy. This is because when 62 is on current flows in one direction via capacitor 64 and when 63 is on current flows via 64 in the other direction.

As an alternative, the output buffer circuit of FIG. 5 may if desired be modified to include a tuned input filter circuit in addition to transistors to replace transistors 62 and 63 and operating in a class B mode as compared to the switching mode of those of FIG. 1. Such modification and variation to achieve rejection of undesired signals are within the normal skills of the engineer.

An alternative but less preferable form of the static relaying circuit described with reference to FIG. 1 is shown in FIG. 6 in which the "contact" portions of the circuit are substantially as shown in FIG. 1 but the coil portion incorporates a diode pump circuit as a means for in response to a modulation function, generating an intermediate signal at terminals A B of opposite polarity to the supply potential. Thus the "coil" portion of FIG. 6 again has a pair of supply terminals denoted by reference 71 connected to the plates of a four terminal capacitor 72 the other terminals of which are connected to ground. This capacitor provides isolation of the supply for high frequency signals to prevent interaction between circuits connected to the same supply.

Transistors 73 and 74 operate as emitter followers and the emitters thereof are connected to a diode pump circuit comprising resistor 76, capacitor 77, diodes 78 and 79 and capacitor 80. Between the upper terminal of capacitor 80 and the supply line there is connected a potential divider formed of resistors 81 and 82 the junction of which is connected to the base electrodes of a further pair of transistors 83 and 84 also connected as emitter followers with the emitters connected to an intermediate signal point denoted B in the circuit. The intermediate signal reference point denoted A is connected to the grounded side of the capacitor 80. In order to limit the voltage which may be obtained on the capacitor 80, a zener diode 85 is included between the collector electrode of the transistor 83 and ground as shown. The "coil" portion of the circuit has control input terminals denoted by reference 86 connected between the common base of transistors 73 and 74 and ground.

The "contact" portion of the relaying circuit comprises three insulated signal couplers to which the potential at terminals A and B is applied in a desired sense to effect coupling between input and output terminals in dependence upon the polarity at terminals A and B in the same manner as described with reference to FIG. 1.

In operation of the relaying circuit of FIG. 6, a d.c. supply is connected to the terminals 71 with the polarity shown and a static switch is connected across the control terminals 86. Assuming that the static switch is continuously open, the potential at the upper terminal of the capacitor 80 is at a positive potential determined by the voltage drop across the resistors 87, 81 and 82 and diodes 78 and 79. The voltage at the terminals B, is a somewhat higher positive potential corresponding to that at the junction of terminals 71 and 72 and is derived via the emitter followers 73 and 74. A similar situation exists assuming that the static switch across terminals 86 is continuously closed such that the terminals 86 are clamped to earth potential and there is no modulation. If however the static switch across terminals 76 is operated intermittently at a frequency which is sufficient to operate the diode pump circuit formed of components 76, 77, 78, 79, the circuit gives rise to a negative potential on the capacitor 80 and at the junction of resistors 81 and 82. Therefore the emitter followers 83 and 84 give rise to a corresponding negative potential at the terminal B. The circuit parameters may be so designed that in the event of intermittent operation of the static switch across terminals 86 of sufficient frequency, a negative voltage of say −5 volts is present at the terminal B whereas if the switching device across terminals 86 is continuously closed or continuously open, a voltage of say +5 volts is present at the terminal B. The circuit therefore functions similarly to that of FIG. 1 but lacks the undesired-signal rejection afforded by the tuned circuit provided in FIG. 1.

From the foregoing, it will be readily apparent that all relay interlocking systems as known to those skilled in the art of relay interlocking can be adapted to replace relays be static relaying circuits in accordance with the invention and they can thereby be endowed with the far-reaching advantages of static switching techniques as compared with relays which employ moving parts and electrical contacts.

Further, by employing circuits based upon those described, interlocking configurations can be provided which can provide failure to safety to a degree which can be relied upon for vital circuit functions such as need to be provided in applications such as railway signalling in which up to the present electromechanical relays have been regarded as having no signal from the safety point of view.

Having thus described our invention what we claim is:

1. A fail-safe static relaying circuit comprising, supply terminals connected to an electrical supply source, control terminals connected to a modulating device having a predetermined frequency, an insulated signal coupler connected between a pair of input and output terminals, circuit means energized by said supply source applied to said supply terminals and responsive to the predetermined frequency of said modulating device to produce a given polarity of an intermediate signal to which said insulated signal coupler is responsive so that the coupling condition between said input and said output terminals is controlled.

2. The fail-safe static relaying circuit as defined in claim 1, wherein said insulated signal coupler includes a pair of electrically isolated components which are capable of transmitting a signal between said input and output terminals.

3. The fail-safe static relaying circuit as defined in claim 1, wherein said insulated signal coupler includes an illumination emitting and an illumination semiconductor device which is subject to illumination only when the given polarity of said intermediate signal is applied to said diode.

4. The fail-safe static relaying circuit as defined in claim 2, wherein said transmitted signal is a modulated signal.

5. The fail-safe static relaying circuit as defined in claim 1, wherein the given polarity of said intermediate signal is such that said insulated signal coupler couples said input and said output terminals.

6. The fail-safe static relaying circuit as defined in claim 1, wherein the given polarity of said intermediate signal is such that said insulated signal coupler decouples said inut and said output terminals.

7. The fail-safe static relaying circuit as defined in claim 1, wherein a plurality of insulated signal couplers are controlled by the given polarity of the intermediate signal produced by said circuit means.

8. The fail-safe static relaying circuit as defined in claim 7, wherein each of said plurality of insulated signal couplers is connected between a pair of input and output terminals.

9. A fail-safe static relaying circuit comprising a first pair of terminals connected to a d.c. supply source, a second pair of terminals connected to a modulating device, an insulated signal coupler interconnected between input and output means, circuit means energized by the application of said d.c. supply source to said first pair of terminals and responsive to the presence and absence of said modulating device to produce an intermediate signal to establish a first and a second coupling state of said insulated signal coupler.

10. A fail-safe static relaying circuit as defined in claim 9, wherein a first given magnitude and polarity of said intermediate signal establishes said first coupling state of said insulated signal coupler and a second given magnitude and polarity of said intermediate signal establishes said second coupling state of said electrical coupler.

11. A fail-safe static relaying circuit as defined in claim 10, said first given magnitude and polarity of said intermediate signal results in said insulated signal coupler coupling said input means to said output means.

12. A fail-safe static relaying circuit as defined in claim 10, wherein said second given magnitude and polarity of said intermediate signal results in said insulated signal coupler decoupling said input means from said output means.

13. A fail-safe static relaying circuit as defined in claim 9, wherein said insulated signal coupler is an illumination coupled device.

14. A fail-safe static relaying circuit as defined in claim 13, wherein said illumination coupled device includes an illumination emitting unilaterally conductive element and an illumination responsive semiconductor element.

15. A fail-safe static relaying circuit as defined in claim 9, wherein said modulating device is controlled by a switch which is connected to said second pair of terminals.

16. A fail-safe static relaying circuit as defined by claim 9, wherein said circuit means producing said intermediate signal includes a transformer.

17. A fail-safe static relaying circuit as defined in claim 16, wherein the secondary winding of said transformer is connected to a first pair of terminals of four-terminal capacitor by a diode.

18. A fail-safe static relaying circuit as defined in claim 17, wherein the second pair of terminals of said four-terminal capacitor are connected to a zener diode.

* * * * *

UNITED STATES PATENT AND TRADEMARK OFFICE
CERTIFICATE OF CORRECTION

PATENT NO. : 3,809,930
DATED : May 7, 1974
INVENTOR(S) : Christopher Robert Brown, Terence Malcolm George & David John Norton It is certified that error appears in the above-identified patent and that said Letters Patent are hereby corrected as shown below:

Column 7, line 49, change "inut" to --input--

Column 8, line 37, change "semiconductor" to --semiconductive--

Signed and Sealed this

Fourth Day of January 1977

[SEAL]

Attest:

RUTH C. MASON
*Attesting Officer*

C. MARSHALL DANN
*Commissioner of Patents and Trademarks*